(12) United States Patent
Struik

(10) Patent No.: US 8,380,984 B2
(45) Date of Patent: Feb. 19, 2013

(54) IMPLICIT CERTIFICATE VERIFICATION

(75) Inventor: Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 0 days.

(21) Appl. No.: 13/284,770

(22) Filed: Oct. 28, 2011

(65) Prior Publication Data

US 2012/0047363 A1 Feb. 23, 2012

Related U.S. Application Data

(63) Continuation of application No. 11/940,659, filed on Nov. 15, 2007, now Pat. No. 8,069,346.

(60) Provisional application No. 60/866,013, filed on Nov. 15, 2006.

(51) Int. Cl.
*H04L 29/06* (2006.01)

(52) U.S. Cl. ........................... 713/156; 713/171

(58) Field of Classification Search .................. 713/170, 713/171, 156; 380/283, 285, 263
See application file for complete search history.

(56) References Cited

U.S. PATENT DOCUMENTS

| | | | |
|---|---|---|---|
| 5,889,865 | A | 3/1999 | Vanstone et al. |
| 6,122,736 | A | 9/2000 | Vanstone et al. |
| 6,243,467 | B1 | 6/2001 | Reiter et al. |
| 6,792,530 | B1 | 9/2004 | Qu et al. |
| 7,702,105 | B1 | 4/2010 | Gura et al. |
| 8,069,346 | B2 * | 11/2011 | Struik ........................... 713/156 |
| 2003/0044003 | A1 | 3/2003 | Chari et al. |
| 2005/0114651 | A1 | 5/2005 | Qu et al. |
| 2005/0193219 | A1 | 9/2005 | Vanstone |
| 2007/0064932 | A1 | 3/2007 | Struik et al. |

FOREIGN PATENT DOCUMENTS

| | | |
|---|---|---|
| JP | 08-328472 A | 12/1996 |
| JP | 2004-507156 A | 3/2004 |
| WO | WO 99/20020 A1 | 4/1999 |
| WO | WO 99/49612 A1 | 9/1999 |
| WO | WO 00/44127 A1 | 7/2000 |

OTHER PUBLICATIONS

Aditya, R. et al.; "Batch Verification for Equality of Discrete Logarithms and Threshold Decryptions"; in Proceedings of Applied Cryptography and Network Security: 2004; Jakobsson, M.; Yung, M.; Zhou, J. (Eds.); ACNS 2004; Lecture Notes in Computer Science; 2004; pp. 494 to 508; vol. 3089; Springer-Verlag, New York.
Cao, T. et al.; "Security Analysis of Some Batch Verifying Signatures from Pairings"; International Journal of Network Security; Sep. 2006; pp. 138 to 143; vol. 3, No. 2.
Cheon, J.H.; Lee, D.H.; "Use of Sparse and/or Complex Exponents in Batch Verification of Exponentiations"; International Association for Cryptologic Research; IEEE Transactions on Computers; Dec. 2006; pp. 1536 to 1542; vol. 55, No. 12; retrieved from http://eprint.iacr.org/2005/276.pdf.

(Continued)

*Primary Examiner* — Edward Zee
(74) *Attorney, Agent, or Firm* — John R. S. Orange; Blake, Cassels & Graydon LLP

(57) ABSTRACT

A method of computing a cryptographic key to be shared between a pair of correspondents communicating with one another through a cryptographic system is provided, where one of the correspondents receives a certificate of the other correspondents public key information to be combined with private key information of the one correspondent to generate the key. The method comprises the steps of computing the key by combining the public key information and the private key information and including in the computation a component corresponding to verification of the certificate, such that failure of the certificate to verify results in a key at the one correspondent that is different to the key computed at the other correspondent.

12 Claims, 2 Drawing Sheets

OTHER PUBLICATIONS

Chevallier-Mames, B. et al.; "Low-Cost Solutions for Preventing Simple Side Channel Analysis: Side-Channel Atomicity" International Association for Cryptologic Research, IEEE Transactions on Computers; Jun. 2004; pp. 760 to 768; vol. 53, No. 6; retrieved from http://eprint.iacr.org/2003/237.pdf.

Chevallier-Mames, B.; "Self-Randomized Exponentiation Algorithms" in Proceedings of Topics in Cryp-tology—CT-RSA 2004; Okamota T. (Ed.); Lecture Notes in Computer Science; 2004; pp. 236 to 248; vol. 2964; Springer-Verlag, New York.

Diffie, W. and Hellman, Martin E.; "New Directions in Cryptography"; IEEE Transactions on Information Theory; Nov. 1976; pp. 644 to 654; vol. IT-22, No. 6.

Johnson, D. et al.; "The Elliptic Curve Digital Signature Algorithm (ECDSA)"; Aug. 1, 2001; pp. 36 to 63; International Journal of Information Security; vol. 1, No. 1; Published on-line Jul. 27, 2001.

Kocher, Paul C.; "Timing Attacks on Implementations of Diffie-Hellman, RSA, DSS, and Other Systems"; Advances in Cryptology—CRYPTO '96, Lecture Notes in Computer Science; 1996; pp. 104 to 113; vol. 1109, Springer-Verlag, New York.

Law. Laurie et al.; "An Efficient Protocol for Authenticated Key Agreement"; Designs, Codes and Cryptography; 2003; pp. 119 to 134; Kluwer Academic Publishers.

Lamacchia, B. et al.; "Stronger Security of Authenticated Key Exchange"; Provable Security; Susilo et al, (Eds.); 2007; pp. 1 to 16; Lecture Notes in Computer Science; vol. 4784; Springer-Verlag, New York; retrieved from http://eprint.iacr.org/2006/073.pdf.

Lim, C.H. and Lee, P.J.; "On the Security of Interactive DSA Batch Verification"; Electronic Letters: Sep. 15, 1994; pp. 1592 to 1593; vol. 30, No. 19.

Proos, J.; "Joint Sparse Forms and Generating Zero Columns when Combing"; Centre for Applied Cryptographic Research; Corr 2003-23; 2003; University of Waterloo; Ontario, Canada.

Solinas, J.; "Low-weight Binary Representations for Pairs of Integers"; Centre for Applied Cryptographic Research, Corr 2001-41; 2001; University of Waterloo; Ontario, Canada.

Public Key Cryptography for the Financial Services Industry, Key Agreement and Key Transport Using Elliptic Curve Cryptography; X9.63/2001; Nov. 20, 2001; pp. 47 to 117; American National Standards Institute; American Bankers Association.

Hankerson, Darrel et al.; Guide to Elliptic Curve Cryptography; 2004; pp. 98 to 101; Springer-Verlag, New York.

Antipa, A. et al.; "Accelerated Verification of ECDSA Signatures"; Proceedings of Selected Areas in Cryptography—SAC2005; Lecture Notes in Computer Science; 2006; pp. 307 to 318, vol. 3897; Springer, New York.

Bellare, M. et al.; "Fast Batch Verification for Modular Exponentiation and Digital Signatures"; Proceedings of Advances in Cryptology—Eurocrypt'98; Lecture Notes in Computer Science; 1998; pp. 236 to 250, vol. 1403; Springer-Verlag, New York.

Badra, M. et al. "Key-Exchange Authentication Using Shared Secrets"; Computer; pp. 58 to 66; Mar. 2006; vol. 39, Issue 3.

Menezes, A. et al.; Handbook of Applied Cryptography; 1997; pp. 397 to 399; CRC Press, U.S.A.

Okeya, Katsuyuki et al.; "A Scalar Multiplication Algorithm with Recovery of the y-Coordinate on the Montgomery Form and Analysis of Efficiency for Elliptic Curve Cryptosystems (Special Section on Cryptography and Information Security)"; IEICE transactions on fundamentals of electronics, communications and computer sciences; pp. to 84 to 93; Jan. 1, 2002; vol. E85-A, No. 1; The Institute of Electronics, Information and Communication Engineers; http://ci.nii.ac.jp/naid/110003209080.

Cheng, Jiin-Chiou et al.; "Correction on "A Scalar Multiplication Algorithm with Recovery of the y-Coordinate on the Montgomery Form and Analysis of Efficiency for Elliptic Curve Cryptosystems"(Information Security)"; IEICE transactions on fundamentals of electronics, communications and computer sciences; pp. 1827 to 1929; Jul. 1, 2004; vol. E87-A, No. 7; The Institute of Electronics, Information and Communication Engineers; http://ci.nii.ac.jp/naid/110003213107.

Ito, Koichi et al. "Address-bit DPA niyoru OK-ECDH to OK-ECDSA no kaiseki houkoko"; [Report on analysis of OK-ECDH and OK-ECDSA by Address-bit DPA]; Research Report by The Institute of Electronics, Information and Communication Engineers; pp. 17 to 24; Sep. 13, 2002; vol. 102, No. 323; http://sciencelinks.jp/j-east/article/200223/000020022302A0865897.php.

Engel, Lawrence J.; Search Report from corresponding PCT Application No. PCT/CA2007/002049; search completed Feb. 7, 2008.

San Millan Maeso, J.; Search Report from corresponding European Application No. 07845519.3, search completed Jul. 2, 2010.

English-language translation of Office Action dated Nov. 29, 2011 issued in connection with corresponding Japanese Application No. 2009-538569.

* cited by examiner

IMPLICIT CERTIFICATE VERIFICATION

This application is a continuation of U.S. application Ser. No. 11/940,659 filed on Nov. 15, 2007, now U.S. Pat. No. 8,069,346, which claims priority from U.S. Application No. 60/866,013 filed on Nov. 15, 2006, the contents of each are incorporated herein by reference.

FIELD OF THE INVENTION

The present invention relates to public key cryptography.

BACKGROUND OF THE INVENTION

Public key cryptography is used to permit secure communication between a pair of correspondents and to permit authentication of a message originating at one of the correspondents. In a public key cryptosystem each correspondent utilizes a private key and a public key related to the private key by a mathematical function. The mathematical function presents a "difficult" mathematical problem to ensure that a private key of a party cannot be obtained from the corresponding public key. Such problems include the difficulty in factoring the product of two large primes, as used in RSA cryptosystems, and the intractability of the discrete log problem over a finite field as used in the digital signature algorithm (DSA). Discrete log systems are widely used and a particular adaptation of such a system makes use of points of an elliptic curve defined over a finite field. Such systems, referred to as elliptic curve cryptosystems (ECC), offer high levels of security at smaller key sizes than other systems.

Where messages are to be exchanged securely, the public and private keys are used in particular protocols referred to generally as key agreement protocols to establish a shared key between the correspondents without disclosing the respective private keys. The shared key can then be used to encrypt and decrypt messages between the correspondents.

Elliptic curve public-key key agreement protocols typically include the following steps:

Key contributions. Each party randomly generates a short-term (ephemeral) public key, from a private key that is a random integer and a seed point to provide a point representing the ephemeral public key and communicates the corresponding ephemeral public key to the other party (but not the private key). In addition, it may communicate its long-term static public key.

Key establishment. Each party computes the shared key based on the static and ephemeral keys it received from the other party and based on the static and ephemeral private keys it generated itself. Due to the properties of the elliptic curve, both parties arrive at the same shared key.

Key authentication. Each party verifies the authenticity of the long-term static key of the other party, to obtain evidence that the only party that may be capable of computing the common key is, indeed, its perceived communicating party.

Key confirmation. Each party evidences possession of the common key to the other party, usually by communicating a message authentication check value over the strings corresponding to the key contributions communicated by either party. This confirms to each party the true identity of the other party and proves that that party successfully computed the common key. This step may be done as part of the key agreement protocol or subsequently through the use of the shared keys.

The key authentication step is typically carried out independently of the other protocol steps described above and usually involves checking the validity of a certificate that vouches for the authenticity of the binding between a party and its private key by means of the corresponding public key. The separate key authentication step allows more flexibility (e.g., in the use of a certificate), but comes at significant cost, since the online computational cost of the key agreement protocol is dominated by the sum of the cost of the key authentication step and the cost of the key computation during the key establishment step.

The certificate is essentially a trusted party's signature of the public key of the correspondent together with the other information such as the name of the issuing party and the name of the certificate holder. In an ECC system, signatures are usually performed and verified using the ECDSA protocol although other signature protocols may be used. By way of example, ECDSA signature generation operates on the domain parameters of the ECC, a private key d, and a message m which, in the context of a certificate, will include the public key of the correspondent. The outputs are the signature (r,s), where the signature components r and s are integers, and proceeds as follows.

1. Select a random integer $k \in_R [1, n-1]$, n being one of the domain parameters.
2. Compute $kG=(x_1,y_1)$ and convert $x_1$ to an integer $\bar{x}_1$, where G is a point on an elliptic curve E and is one of the domain parameters.
3. Compute $r=\bar{x}_1 \bmod n$, wherein if r=0, then go back to step 1.
4. Compute e=H(m), where H denotes a cryptographic hash function whose outputs have a bit length no more than that of n (if this condition is not satisfied, then the outputs of H can be truncated).
5. Compute $s=k^{-1}(e+a\ r) \bmod n$, where a is a long term private key of the signer. If s=0, then go back to step 1.
6. Output the pair (r, s) as the ECDSA signature of the message m.

ECDSA signature verification operates on several domain parameters, a long term public key Q where Q=αG, the message m, and the signature (r, s) derived above. ECDSA signature verification outputs a rejection or acceptance of the signature, and proceeds as follows.

1. Verify that r and s are integers in the interval [1,n−1]. If any verification fails then a rejection is returned.
2. Compute e=H(m).
3. Compute $w=s^{-1} \bmod n$.
4. Compute $\mu_1=ew \bmod n$ and $\mu_2=rw \bmod n$.
5. Compute $R=\mu_1 G+\mu_2 Q=s^{-1}(eG+rQ)$ (from 3 and 4 above)
6. If R=∞ then the signature is rejected.
7. Convert the x-coordinate $x_1$ of R to an integer $\bar{x}_1$; compute $v=\bar{x}_1 \bmod n$.
8. If v=r then the signature is accepted, if not then the signature is rejected.

It will be appreciated that other signature generation and verification steps may be used such as ECGDSA and that certain steps to confirm the integrity of the signature are sometimes omitted.

Therefore, to authenticate the public key of the correspondent i.e. the message m which contains the public key of the correspondent and other information it is necessary to verify the signature on the certificate.

Subsequent to authentication, it is usual to confirm that the key of each party is indeed the same. During execution of a key agreement protocol between two parties A and B, party A establishes the key $K_A$, while party B establishes the key $K_B$.

Key confirmation consists of A evidencing knowledge of $K_A$ to B by conveying some quantity $f(K_A)$, where $f$ is some publicly known function, to B, who will compare this to his own computed value $f(K_B)$ and accept only if these values match (and vice versa). The function $f$ is such that if $f(K_A)= f(K_B)$, then with overwhelming probability $K_A=\pm K_B$ and a common key has been established.

As noted above, the key authentication step adds significant computational load to the key agreement protocol. It is therefore an object of the present invention to obviate or mitigate the above disadvantages.

SUMMARY OF THE INVENTION

In general terms, the Applicant's have recognized that by computing conjointly a combination of the shared key and the certificate verification, an implicit verification of the certificate is obtained in the subsequent key confirmation step.

Preferably, the signature verification uses a homogeneous verification equation, i.e. one that equates to O, such that failure to verify the certificate will result in an inequality between the computed values of the shared key.

In one aspect, there is provided a method of computing a cryptographic key to be shared between a pair of correspondents communicating with one another through a cryptographic system, one of the correspondents receiving a certificate of the other correspondents public key information to be combined with private key information of the one correspondent to generate the key, the method comprising the steps of computing the key by combining the public key information and the private key information and including in the computation a component corresponding to verification of the certificate, such that failure of the certificate to verify results in a key at the one correspondent that is different to the key computed at the other correspondent.

In another aspect, there is provided a computer readable media, a cryptographic unit and a system configured for performing the steps of the above method.

BRIEF DESCRIPTION OF THE DRAWINGS

An embodiment of the invention will now be described with reference to the accompanying drawings in which.

DETAILED DESCRIPTION OF THE INVENTION

Figure 1:
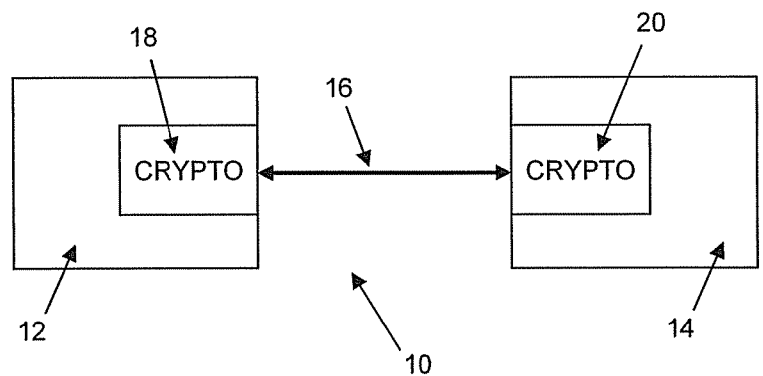
FIG. 1 is a schematic representation of a data communication system.

Referring therefore to FIG. 1, a cryptographic communication system is generally denoted by numeral 10. The system 10 has a first correspondent 12 and a second correspondent 14 who may communicate with each other over a communication channel 16. The communication channel 16 may or may not be secure. Each correspondent has a cryptographic module 18 and 20 respectively, for performing cryptographic operations operating on the elliptic curve E defined over a chosen field. The cryptographic module 18 may be hardware, computer readable software instructions or a combination of both that is configured to perform cryptographic operations such as those described below.

The correspondent 12 has a long term private key "a" and a corresponding long term public key $A=aG$ where G is a base point on the curve specified in the domain parameters.

In order to authenticate the public key A to the correspondent 12, a certificate $T_A$ is obtained from a trusted authority. The certificate includes the signature of the trusted authority on the public key A which can be verified using the trusted authority's public key Q.

Similarly, the correspondent 14 has a long term private key b, and a corresponding long term public key $B=bG$ and a certificate $T_B$ of its public key. The certificate $T_B$ may have been signed by another trusted party or using another public key than was used to obtain certificate $T_A$.

Typically, each correspondent 12, 14 can generate a random integer x, y respectively for use as a session or ephemeral private key that will generate corresponding ephemeral public keys xG, yG. However, for clarity, a first embodiment will be described in which a common key is established using the long term keys of each correspondent.

Figure 2:
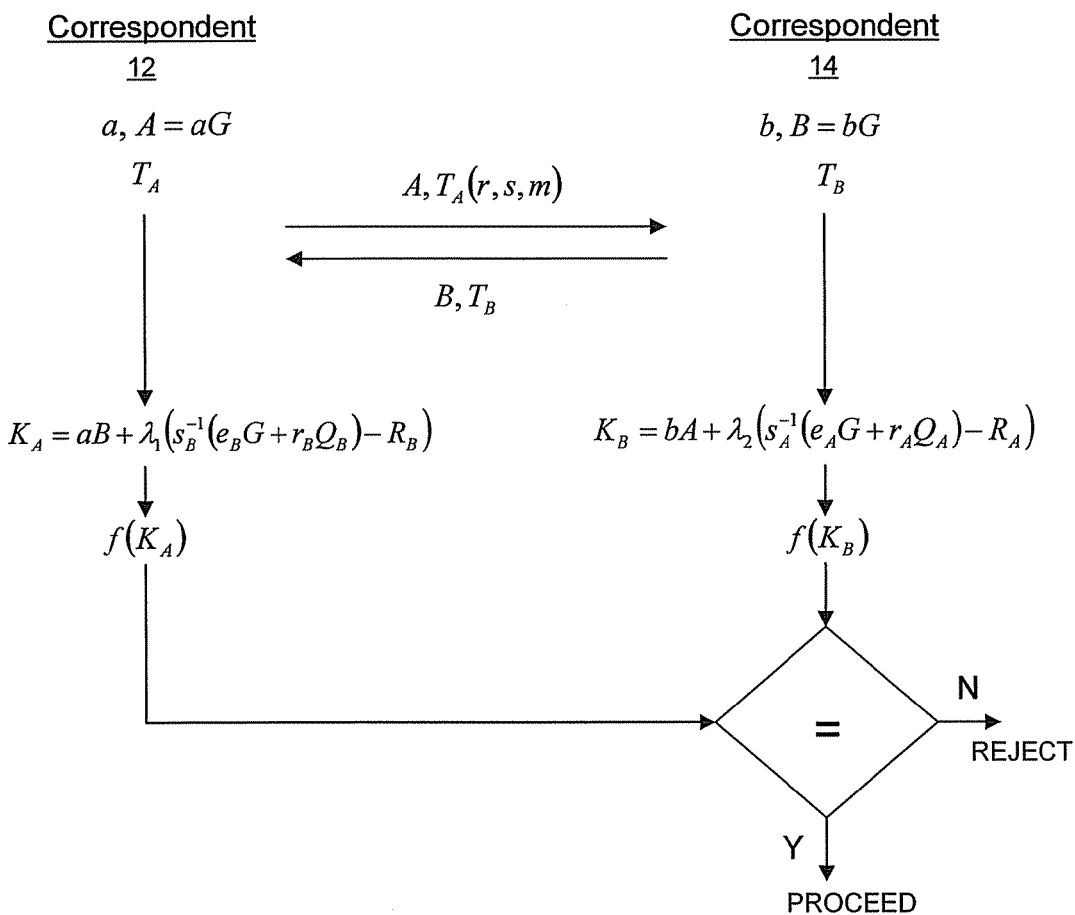
FIG. 2 is a representation of a first key agreement protocol.

In a first key agreement protocol shown in FIG. 2, an static elliptic curve Diffie Hellman (ECDH) key generation is employed with certificates $T_A$, $T_B$, signed using ECDSA.

Initially, the correspondents 12, 14 exchange public keys A, B and the respective certificates $T_A$, $T_B$. The common key is $K=abG$, which can be computed for each party from the public information received and the private information it has. Thus $K_A=aB$ and $K_B=bA$.

To verify the authenticity of the key, it is normal to verify the certificates $T_A$ and $T_B$. However, in the present embodiment, the key generation and authentication are performed conjointly to provide efficiency. As noted above, the ECDSA provides in its verification that $R=s^{-1}(eG+rQ)$. Accordingly $s^{-1}(eG+rQ)-R=\Sigma=O$ if the certificate verifies. The value of R can be recovered from the signature component r by taking r to be the value of the x-coordinate of the point R. The x-coordinate provides two possible y values and, to resolve the ambiguity, an indication of the correct value is included in the signature or there is a pre-agreed rule to select one of the values as the correct one that allows R to be computed. Additional techniques for recovering R are disclosed in U.S. application Ser. No. 11/333,296, the contents of which are incorporated by reference.

Each correspondent also has the signature (r,s) from the certificate $T_A$, $T_B$. To compute the key K, correspondent 12 computes the key $K_A$ by combining the public key and private key information and including a component corresponding to the signature verification. Thus:

$$K_A = abG + \lambda_1(s_B^{-1}(e_BG + r_BQ_B) - R_B)$$

where $\lambda_1$ is a random value $r_B$, $s_B$ are the signature components of the certificate $T_B$.

$e_B$ is the hash of the message m in the certificate, which includes the public key B of correspondent 14 and;

$R_B$ is the value recovered from $r_B$.

It will be recognized that the signature verification component $s_B^{-1}(e_BG + r_BQ_B) - R_B$ should be zero if the certificate authenticates the public key of B and therefore the computation should yield the key $K_A=aB$.

Similarly, the correspondent 14 computes $K_B=abG+\lambda_2(s_A^{-1}(e_AG+r_AQ_A)-R_A)$ where the values of $r_A$, $s_A$, and $R_A$ relate to the certificate $T_A$. Again, if the certification authenticates, this should yield the key $K_B=bA$.

After each correspondent 12, 14 has computed the respective keys $K_A$, $K_B$, they implement the key confirmation step to exchange information that is a function of the common key. If the information received does not match that computed, then the key is rejected.

One reason for the common keys to differ is that the value obtained from the certificate verification portion is not zero, indicating that the certificate has not authenticated. By inserting a random value λ in each computation, which will usually be different for each the correspondents 12, 14, the efficacy of the authentication process is enhanced.

Thus, by conjointly computing the value of the common key and, a relationship corresponding to O, if the certificate authenticates, a reduction of the computation is obtained.

Figure 3:
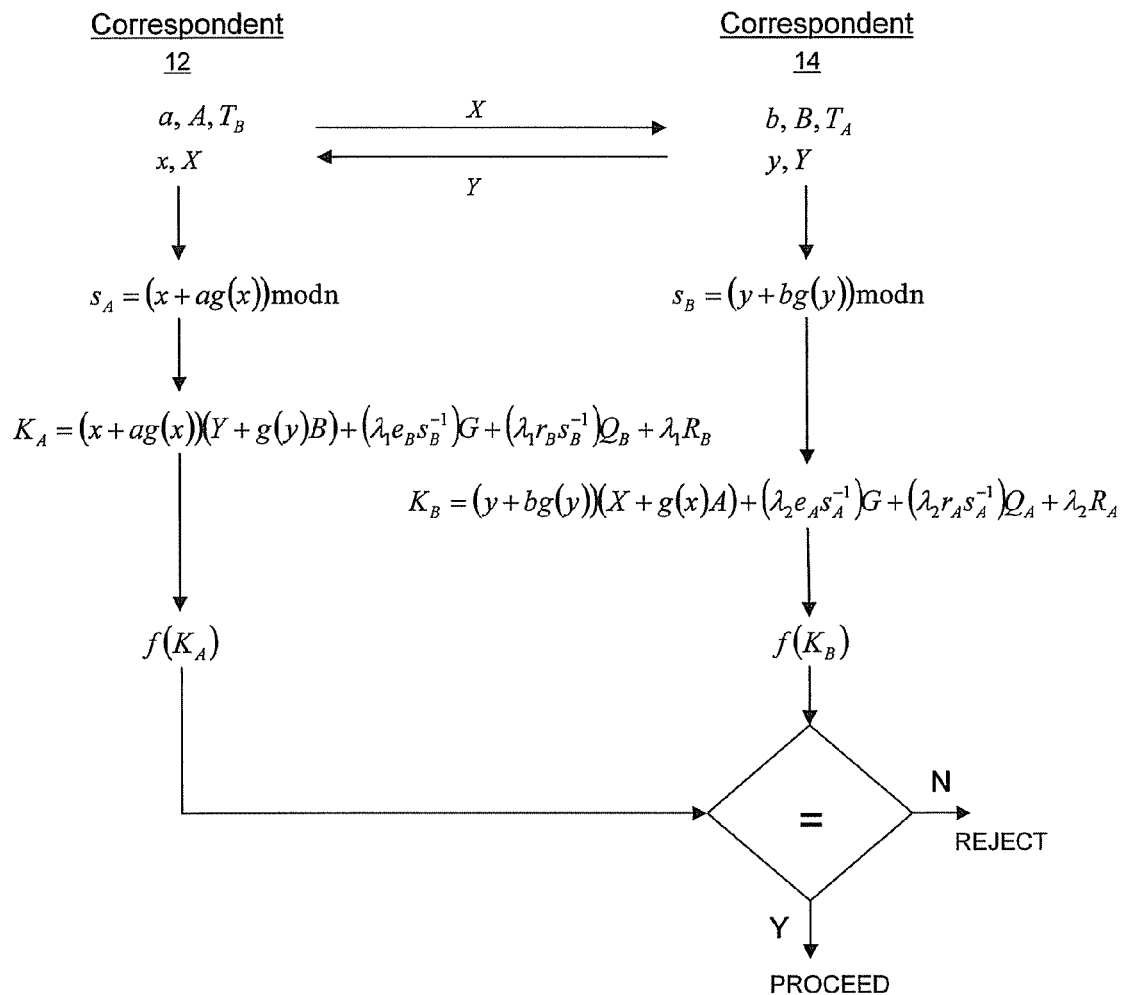
FIG. 3 is a representation of a further key agreement protocol.

A further embodiment is shown in FIG. 3 in which an MQV key agreement protocol is combined with authentication of certificates signed with ECDSA.

In the embodiment of FIG. 3, correspondent 12 and 14 have respectively long term private keys a, b, long term public keys A, B, short term private keys x, y and short term public keys X, Y. In ECMQV the common key is of the form:

$$K = cX + dB$$

where
$c = x + ag(x) \pmod{n}$ and
$d = cg(Y) \pmod{n}$
where g is publicly known representation function that maps elliptic curve points to a suitable integer.

Assuming each correspondent has the certificate $T_A$, $T_B$ of the other, each correspondent sends the short term public key X, Y, respectively to the other correspondent.

The correspondent 12 computes $s_{12} = (x + ag(x)) \bmod n$. Correspondent 14 computes $s_{14} = (y + bg(y)) \bmod n$. The common key K can then be computed as $$K = s_{12}(Y + g(y)B) = s_{14}(X + g(x)A)$$

To authenticate the key, the certificate of the correspondents long term public key must be authenticated. Accordingly, as described above, the common key K is computed by correspondent 12 as $$K_A = s_{12}(Y + g(y)B) + \lambda\Sigma = (x + ag(x))(Y + g(y)B) + (\lambda_1 e_B s_B^{-1})G + (\lambda_1 r_B s_B^{-1})Q + \lambda_1 R_B$$

and by correspondent 14 as $$K_B = s_{14}(X + g(x)A) + \lambda\Sigma = (y + bg(y))(X + g(x)A) + (\lambda_2 e_A s_A^{-1})G + (\lambda_2 r_A s_A^{-1})Q_A + \lambda_2 R_A$$

For each correspondent, λ is a random integer and Σ is the signature verification relationship $s^{-1}(eG + rQ) - R$ for the respective certificates.

Assuming Σ=O, the keys will match and the certificate will be authenticated implicitly.

The efficiencies obtained may be attributed to savings on point doubling operations and the possibility to use multiple point multiplication strategies.

From a security point, the random values of λ should be chosen from a set of size $O(\sqrt{n})$ since this corresponds to the workload of solving the ECDLP problem. The set from which λ is chosen may be varied, with consequent variation in security. If λ is drawn from a set of size $2^t$, where $t < (\log_2 n)_2$, the key authentication strength may go down to t bits. With such a choice of λ, computing $aB + \lambda R$ involves $wt_H(a)$ point additions involving B or B−R, where $wt_H$ is the Hamming weight of the binary representation of the value a. This is the same number of point additions involved in computing aB.

The quantity $(\lambda es^{-1})G + (\lambda rs^{-1})Q$ can be computed using non-adjacent form (NAF) as described more fully in Guide to Elliptic Curve Cryptography, Vanstone et al., Springer, at pages 98 to 101, the contents of which are incorporated by reference.

The workload is evaluating $K_A$ in this way is approximately m point additions and m doublings, where m is the bit size of the curve.

By comparison, evaluating $K_A = aB$ and verifying the ECDSA signature separately has a workload of 5m/6 additions and 2m doubles.

A 30% improvement is therefore attainable. If the "fast verify" techniques shown in U.S. patent application Ser. No. 11/333,296, noted above, are used than savings in the order of 10% are attainable.

One can make further improvements by considering λ with integers in their NAF representation, rather than in their binary representation. Since $wt_H(\alpha) \approx m/3$, one has $|L| \approx 3^{m/3} > \sqrt{n}$ (note that all integers in L are in NAF form, so are unique). Carrying out a similar analysis as above, the approach given here yields approximately 5m/6 adds and m doubles. In this case, the approach given here yields 1.52m adds, rather than 1.70m adds with the binary approach described above, thus yielding an efficiency improvement of 22%, resp. 47% compared to the separate computations (Fast Verify, resp. Ordinary ECDSA Verify). Note that in this case one might write: $aB - \lambda R = (a - \lambda^+ + \lambda^-)B - \lambda^+(R - B) - \lambda^-(R + B)$; where $\lambda = \lambda^+ + \lambda^-$ and $\lambda^+$ and $\lambda^-$ and denote those components of λ with either the same or different sign respectively as corresponding components of a.

One can further generalize this towards w-NAF representations described in Guide to Elliptic Curve Cryptography, Vanstone et al., Springer, at pages 99 (w≧2). Then $|L| = q^t$, where $q := 2^{w-1} + 1$ and $t := wt_H(a)$ (all integers are in w-NAF form, so are unique). If one assumes $wt(\alpha) \approx m/(w+1)$, one obtains $L = (2^{w-1} + 1)^{m/(w-1)} \geq 2^{m/2} \approx \sqrt{n}$. A more detailed analysis yields that the additions in $aB + \lambda R$ can be computed at the same cost as those in aB (using the same method), except for the latter having far larger pre-computation cost approx. $2^{(w+1)(w-2)/2}$ rather than $2^{w-2}$. Storage cost is as follows: 1 vs. 3 (w=2), 2 vs. 8 (w=3), 4 vs. 24 (w=4), 8 vs. 64 (w=5). Hence, if storage cost is the metric of choice, comparisons are somewhat misleading: if one stores 8 points and uses w-NAF techniques only, then one can compute aB using a 5-NAF or use a 3-NAF computation to compute $\alpha B + \lambda R$, with cost 0.166m additions vs. 0.25m additions with the present technique. Thus, the present technique can be thought of as saving m doubles in the evaluation of the ECDSA signature at the expense of 0.083m additional additions in the evaluation of $\alpha B + \lambda R$.

This approach basically removes the doubling operations from the ECDSA verification procedure, i.e., the incremental cost of ECDSA verification becomes m/2 adds only, rather than (after scaling) 0.85m adds (Fast Verify), resp. 1.02m adds (ordinary ECDSA verify), i.e., presenting a 70-104% efficiency improvement of the ECDSA verification procedure. Further improvements may be obtained by more fully exploiting the repertoire of multiple point multiplication methods and by using windowing and w-NAF methods.

With the embodiment of FIG. 3 involving MQV and ECDSA:

$$K_A' = cY + dB + \lambda\Sigma = cY + dB - \lambda R + ((\lambda e \, s^{-1})G + (\lambda r \, s^{-1})Q).$$

Let $L := \{x | \text{supp}(x) \subset \text{supp}(c) \cup \text{supp}(d)\}$, where integers x are represented in binary representation. If c and d are in their JSF-representation, then one has $\text{supp}(c) \cup \text{supp}(d)$ has weight≈m/2 (where m:=$\log_2 n$), so $|L| \approx \sqrt{n}$. With this choice of λ computing $K_A + \lambda R$ involves precisely $wt_H(c,d)$ point additions. λ is chosen such that the nonzero components hereof have the same sign as the corresponding coefficient in cY+dB with respect to pre-computed points Y, B, Y−B, Y+B. (This ensures that all λ are, indeed, unique.) So, all computations can be done involving the 8 points Y, B, Y+B, Y−B, R+Y, R+B, R+Y+B, R+Y−B (rather than requiring 12 points). The quantity $(\lambda\ e\ s^{-1})\ G + (\lambda r\ s^{-1})\ Q$ can be computed using a joint NAF form, once $\lambda$ is determined as indicated above. The total workload involved in evaluating $K_A'$ this way is approximately m point additions and m point doublings. Obviously, improvements are possible, by exploiting the repertoire of multiple point multiplication methods and by using windowing and w-NAF methods. The main improvement, however, is that the combined computation offers the perspective of considerably saving on doubling operations.

The approach above can be used so as to yield a simple side channel attack resistant implementation. Details are as follows. Let $L:=\{x|supp(x) \subset supp(c)\}\$$, where we consider all integers in binary representation. Since $wt(c) \approx m/2$, one has $|L| \approx \sqrt{n}$. Now, let $\lambda = \lambda^+ \lambda^-$, where $\lambda^+$ is a random element of L and where $\lambda^-$ is set to 1 for all positions outside supp(c) and to 0 otherwise. The computation of $c\ Y + d\ B + \lambda^+ R$ can be carried out using the 5 pre-computed points Y, B, Y+B, B+R, and Y+B+R. The quantity $\lambda^- R + ((\lambda\ e\ s^{-1})\ G + (\lambda\ r\ s^{-1})\ Q)$ can be computed, once $\lambda$ is determined as indicated above using the 7 nonzero partial sums involving R, Q, and G. By pre-computing $22=5\times3+3+4$ points, one can compute $K_A'$ using multiple point multiplication, using exactly m+22 point additions and m point doubles. The choice of $\lambda^-$ ensures that each step in the binary method for point multiplication involves an addition. By taking $\lambda^-:=0$, it would have been possible to pre-compute only 19 points, but then it would not have been possible to enforce one addition per iteration round and so a side channel attack may have been possible. This could have been ensured by picking another $\lambda^+$ until such a condition is obtained, however, this might leak side channel information by itself. The approach above has approximately the same cost as the method for prevention of simple side channel attacks based on adding dummy point addition operations during the computation of $K_A$, but achieves ECDSA signature verification as well. Thus, ECDSA signature verification comes virtually for free with this approach.

It is assumed that $\Sigma$ lies in the prime order subgroup generated by G. It should have sufficiently large order. If $\Sigma$ corresponds to an ECDSA verification equation this condition is easily checked by checking that $h\ R \neq O$, where h is the co-factor of the curve.

The approach described above leads to performance improvements, due to savings on doubling operations and the prospects of exploiting multiple point multiplication strategies. Moreover, this approach is not restricted to combining key authentication and key establishment steps during the execution of a key agreement protocol; it can be applied to any setting where one has to compute some keys and verify some elliptic curve equations (in fact, the key need not even be secret). This being said, the approach is most useful in settings where one can verify whether the computed key is correct (since this would yield a verdict on whether the homogeneous elliptic curve equation $\Sigma = O$ holds). Thus, the approach works effectively in all settings where one indeed evidences knowledge of the computed key.

The method for combining verification with key computation works in more general settings than described above. Verification of multiple ECDSA signatures (certificate chains) may be obtained by using combinations of computation and verification equations with a different $\lambda$ for each verification. Similarly, verification of any elliptic curve and batch verification of multiple elliptic curve equations is possible.

Key computation with ECDH-schemes in ANSI X9.63, NIST SP800-56a (including ECIES, Unified Model, STS, ECMQV, ElGamal encryption) is also possible. Computation of non-secret ECC point provided correctness can be checked for example in a PV signature with an ECDSA certificate. Similarly, computation of multiple ECC points provided correctness can be checked.

It is also possible to apply such techniques to operation in other algebraic structures (including hyper-elliptic curves, identity-based crypto systems, etc.).

The use of $\lambda$ to provide simple side channel resistance is virtually for free.

Although the above has been described in terms of certain exemplary embodiments, it will be appreciated that variations thereof are possible within the scope of the claims which follow.

The invention claimed is:

1. A communication device for conjointly computing a cryptographic key and including a component in said cryptographic Key for authenticating said cryptographic key, said cryptographic Key to be shared with a second communication device communicating with said communication device using a cryptographic system, said communication device comprising a processor configured to:
   obtain a certificate corresponding to public key information of said second communication device;
   compute said cryptographic key by combining said public, key information of said second communication device and private key information of said communication device; and
   include in said cryptographic key, said component corresponding to verification of said certificate, such that failure of said certificate to verify results in a key at said communication device that is different to the key computed at said second communication device, said verification utilizing a signature contained in said certificate, and said component equating to a value when said certificate verifies.

2. The communication device according to claim 1 wherein said value is zero.

3. The communication device according to claim 2 wherein a random element is included in said component to mask verification of said certificate.

4. The communication device according to claim 3 wherein said random element is selected to provide repetitive iterations in verification of said signature and thereby inhibit side channel attacks.

5. The communication device according to claim 1 wherein said cryptographic system is an elliptic curve cryptographic system.

6. The communication device according to claim 5 wherein said computation is performed using multiple point multiplications.

7. The communication device according to claim 5 wherein said certificate includes a signature obtained using an elliptic curve signature protocol.

8. The communication device according to claim 7 wherein said signature protocol is ECDSA.

9. The communication device according to claim 5 wherein said public key information is representative of an elliptic curve point and combination of public key information and said private key information includes a point multiplication.

10. The communication device according to claim 9 wherein verification of said signature requires multiple point multiplications.

11. The communication device according to claim 10 wherein said computation is performed using multiple point multiplications.

12. The communication device according claim 1 including the step of confirming the keys generated by said communication device conforms to that of said second communication device.

\* \* \* \* \*

UNITED STATES PATENT AND TRADEMARK OFFICE
CERTIFICATE OF CORRECTION

PATENT NO. : 8,380,984 B2  Page 1 of 1
APPLICATION NO. : 13/284770
DATED : February 19, 2013
INVENTOR(S) : Marinus Struik It is certified that error appears in the above-identified patent and that said Letters Patent is hereby corrected as shown below:

In the Claims

In Column 8, lines 16 and 17, Claim 1, "Key" is replaced with "key".

In Column 8, lines 23 and 24, Claim 1, "public, key" is replaced with "public key".

Signed and Sealed this
Twenty-fifth Day of June, 2013

Teresa Stanek Rea
*Acting Director of the United States Patent and Trademark Office*